United States Patent
Senge et al.

(10) Patent No.: US 7,847,788 B2
(45) Date of Patent: Dec. 7, 2010

(54) DEVICE FOR OPERATING TELEVISION APPLIANCES

(75) Inventors: Michael Senge, Darmstadt (DE); Kai Tomerius, Darmstadt (DE)

(73) Assignee: Thomson Licensing, Boulogne-Billancourt (FR)

( * ) Notice: Subject to any disclaimer, the term of this patent is extended or adjusted under 35 U.S.C. 154(b) by 1670 days.

(21) Appl. No.: 10/475,253

(22) PCT Filed: Mar. 30, 2002

(86) PCT No.: PCT/EP02/03566

§ 371 (c)(1),
(2), (4) Date: Oct. 16, 2003

(87) PCT Pub. No.: WO02/087228

PCT Pub. Date: Oct. 31, 2002

(65) Prior Publication Data

US 2004/0164967 A1    Aug. 26, 2004

(30) Foreign Application Priority Data

Apr. 20, 2001  (DE) .............................. 101 19 648

(51) Int. Cl.
*G06F 3/041* (2006.01)
(52) U.S. Cl. ..................... 345/173; 345/179; 348/734

(58) Field of Classification Search ......... 345/173–179; 348/734
See application file for complete search history.

(56) References Cited

U.S. PATENT DOCUMENTS

| 4,587,520 A | * | 5/1986 | Astle ........................... 345/160 |
| 5,594,859 A | | 1/1997 | Palmer et al. ............... 395/330 |
| 5,627,567 A | * | 5/1997 | Davidson .................... 345/173 |
| 5,706,448 A | * | 1/1998 | Blades ........................ 715/834 |
| 6,982,695 B1 | * | 1/2006 | Canova et al. .............. 345/156 |
| 2001/0026290 A1 | * | 10/2001 | Machida et al. ............. 345/810 |

FOREIGN PATENT DOCUMENTS

| EP | 0268933 A2 | 11/1987 |
| EP | 0927925 A2 | 7/1999 |

* cited by examiner

*Primary Examiner*—Kimnhung Nguyen
(74) *Attorney, Agent, or Firm*—Robert D. Shedd; Harvey D. Fried; Joel M. Fogelson

(57) ABSTRACT

In an arrangement for operating television-technological apparatuses, operating and display elements can be represented on a screen. The screen is provided with a touch-sensitive input field. The respective value of at least one quantity to be set is represented graphically. The at least one quantity to be set can be set by touching the input field in a touch region enclosing the representation and moving the touch point in a direction corresponding to the change in the quantity to be set.

18 Claims, 4 Drawing Sheets

DEVICE FOR OPERATING TELEVISION APPLIANCES

This application claims the benefit under 35 U.S.C. §365 of International Application PCT/EP02/03566 filed Mar. 30, 2002, which claims the benefit of German Application No. 101 19648.2 filed Apr. 20, 2001.

FIELD OF THE INVENTION

The invention relates to an arrangement for operating television-technological apparatuses.

BACKGROUND OF THE INVENTION

Television studio technology often makes use of apparatuses which require a considerable operational complexity owing to a multiplicity of quantities to be set. Such apparatuses are film scanners, for example, including the electronic postprocessing of films, such as, for example, color correction, cameras, recording and reproduction apparatuses and video projectors.

SUMMARY OF THE INVENTION

It is an object of the invention to enable apparatuses of this type to be operated as simply and intuitively as possible. This object is achieved according to the invention by virtue of the fact that operating and display elements can be represented on a screen, that the screen is provided with a touch-sensitive input field, that the respective value of at least one quantity to be set is represented graphically, and that the at least one quantity to be set can be set by touching the input field in a touch region enclosing the representation and moving the touch point in a direction corresponding to the change in the quantity to be set. In this case, it is preferably provided that the touch region is larger than the representation of the quantity to be set.

In the case of the arrangement according to the invention, specifically, the operating and display elements can be represented so distinctly and clearly that the operator intuitively touches the correct input field for an envisaged operating process without long consideration. It is often necessary to carry out operating processes whilst simultaneously observing a monitor image. In this case, in particular, the arrangement according to the invention has the advantage that operators can touch the input field and move the touch point in the direction to be set without having to divert their attention from the monitor image. Furthermore, the movement is relative, that is to say it is connected with the change in the quantity to be set, while the representation of the quantity is absolute.

Specifically, in the arrangement according to the invention, it may be provided that the touching of the input field with a finger or with a suitable article is assigned to the quantity that is respectively to be set if the touching begins in the touched region, it then being unimportant whether the touching ends inside or outside the touch region.

For one-dimensional quantities such as, for example, the saturation setting which affects the entire image, in the arrangement according to the invention it may be provided that the display element displays a one-dimensional quantity by means of the length of a rectangle, and that the touch region is identified by an elongated quadrangle which encloses at least the maximum length.

However, it is also often necessary to set two-dimensional quantities, such as, for example, a color according to hue and saturation. This can preferably be made possible in the arrangement according to the invention by virtue of the fact that at least one display element is a symbol represented on a display area, and wherein the touch region is an area enclosing the display area.

An advantageous refinement of the arrangement according to the invention consists in the fact that at least one operating element is realized by moving the touch point about a pivot, the change in the value to be set being effected by the respective angle of rotation, and that the touch region is significantly larger than the representation of the operating element. As a result, the operator can intuitively select a longer "lever arm" for a finer setting than for a fast, coarser setting.

Another advantageous refinement of the arrangement according to the invention consists in the fact that numeric, alphanumeric and/or symbolic representations of the respective values are provided in addition to the graphical representation. In this case, the numeric, alphanumeric and/or symbolic representations can preferably be changed over. This refinement enables not only the clear graphical representation—in particular by means of the length of a bar—but also an exact numeric display or a display by means of symbols or alphanumeric characters. Thus, by way of example, it is possible to set a characteristic curve and at the same time indicate that this characteristic curve corresponds to a standard. The changeover capability makes it possible to adapt the additional displays to the operators' habits, which differ from country to country, for example.

In another advantageous development of the invention, it is provided that the ratio between the movement and the change in the quantity to be set is adjustable. In this case, it is also possible to set nonlinear characteristic curves, so that, by way of example, slow movements result in a comparatively small change in the quantity to be set and fast movements result in a comparatively large change.

Another development of the arrangement according to the invention consists in the fact that a plurality of operating and display menus are provided, which can be selected with the aid of touch fields provided on the touch-sensitive input field and/or keys, rotary regulators and/or trackballs arranged beside the touch-sensitive input field.

This division into different operating and display menus enables the individual menus to be configured more clearly, so that only the operating and display elements which are required are present in the respective operating situation. In this case, the operation can be facilitated further by virtue of the fact that touch fields are provided, which call a subordinate menu when touched.

For operators who prefer working with conventional setting devices, the arrangement according to the invention may be designed in such a way that setting devices are provided besides the touch-sensitive input fields, the respective functions of said setting devices being represented upon activation of the respective menu at the edge of the screen.

The arrangement according to the invention may also be configured in such a way that the quantities respectively set are transmitted to the television-technological apparatus, and that received set quantities are sent back from the television-technological apparatus and displayed on the screen. This makes it possible to monitor that the settings have actually been transmitted to the television-technological apparatus and processed there.

BRIEF DESCRIPTION OF THE DRAWINGS

Exemplary embodiments of the invention are represented in the drawing using several figures and are explained in more detail in the description below. In the figures.

DETAILED DESCRIPTION OF THE INVENTION

Figure 1:
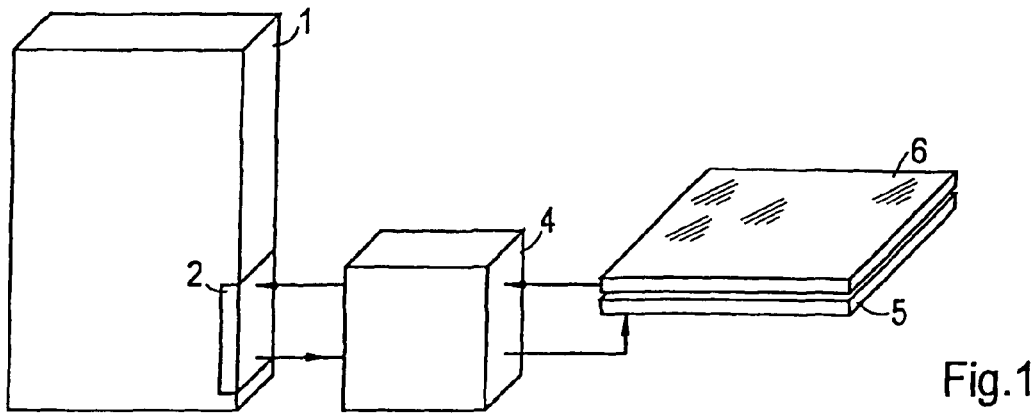
FIG. 1 shows a schematic representation of the arrangement according to the invention.

In FIG. 1, a film scanner 1 is provided with an interface 2 for outputting the settings respectively present in the film scanner and for inputting the settings. The interface 2 serves for connection to a computer 4 associated with the arrangement according to the invention, which computer, on the one hand, controls the representation of the operating and display elements on a screen 5 and, on the other hand, converts output signals of a touch-sensitive input field 6, taking account of the representation on the screen 5, into data for operating the film scanner 1. Methods for representing operating and display elements and also for evaluating the signals resulting from touching the input field are known per se and need not be explained in greater detail in connection with the present invention.

Figure 2:
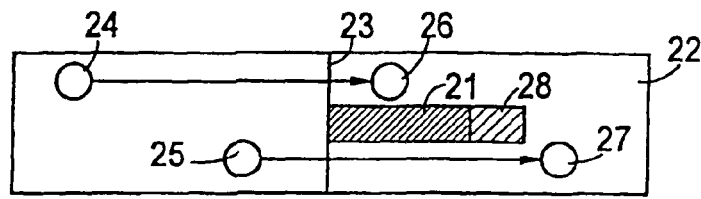
FIG. 2 shows an operating and display element represented on the screen including the movements of the touch points that are suitable for the operation.

FIG. 2 shows the setting of a one-dimensional quantity which is indicated by a bar 21 of variable length. A line 23 from which the bar can run toward the left or right is furthermore represented in the case of the example according to the invention. The line 23 may denote a standard value or, in the case of quantities with a changing sign, the value 0. In order to operate the film scanner, the input field is touched at an arbitrary point on the touch region 22, whereupon the touch point is moved in the direction of the desired change in the quantity. This can be done at 24 or 25, for example, the touching being ended at 26 or 27. The bar 21 is then lengthened by the piece 28, for example, if the film scanner has followed by the command given. FIG. 2 shows a case in which a stepping-down is present between the movement of the touch point and the alteration of the quantity to be set, so that a fine setting is possible.

Figure 3:
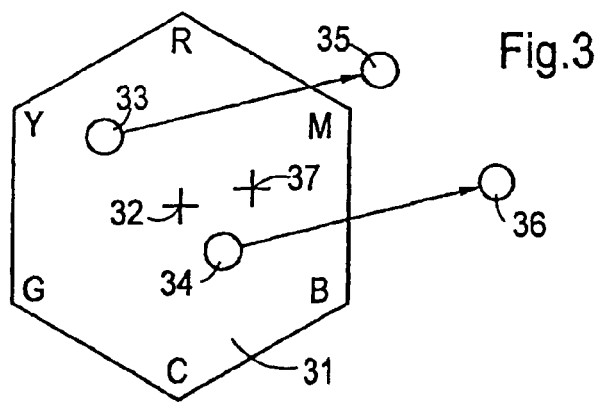
FIG. 3 shows another operating and display element likewise with a representation of the movement of touch points.

FIG. 3 shows the setting of a two-dimensional quantity, namely the color saturation and the hue within a hexagon 31 which represents the possible colors and simultaneously represents the touch region in which the touching of the input field and the movement of the touch points are assigned to the setting in the hexagon 31. A cross 32 represents the two-dimensional quantity (hue and color saturation) respectively set, which can be altered for example with the movements of the touch points 33, 34 toward 35, 36 in the direction of a setting represented at 37. In this case, too, it is possible to observe a monitor image without attention being diverted by the operating process—as is the case for example as a result of grasping a rotary knob.

Figure 4:
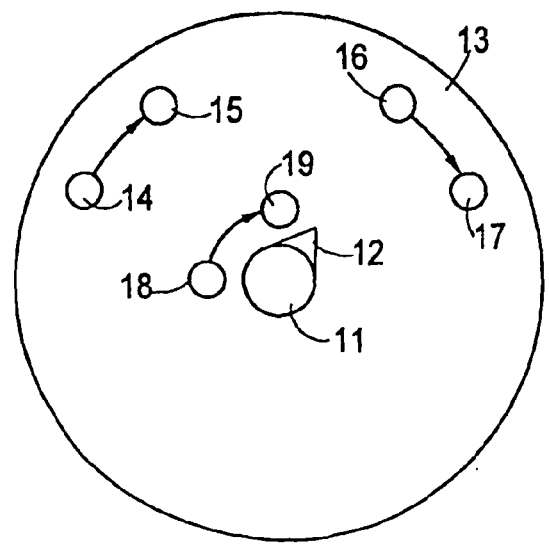
FIG. 4 shows a further operating and display element.

The operating and display element represented in FIG. 4 is the image of a rotary knob 11 provided with a pointer 12. The angular position corresponds to a quantity to be set for the operation of the film scanner 1 (FIG. 1). In order to turn the "rotary knob" 11, the input field is touched in a touch region 13 around the image of the rotary knob 11—for example using a finger or an article suitable for this purpose—and the touch point is moved with at least tangential component. This does not require the image of the pointer 12 to be struck precisely, rather the movement of the touch point can be effected at an arbitrary point in the touch region 13 outside the central point. In the event of a movement of the touch point from 14 to 15 or from 16 to 17, it is possible to perform a fine setting, whereas faster turning for the same distance covered is effected in the event of a movement from 18 to 19.

Figure 5:
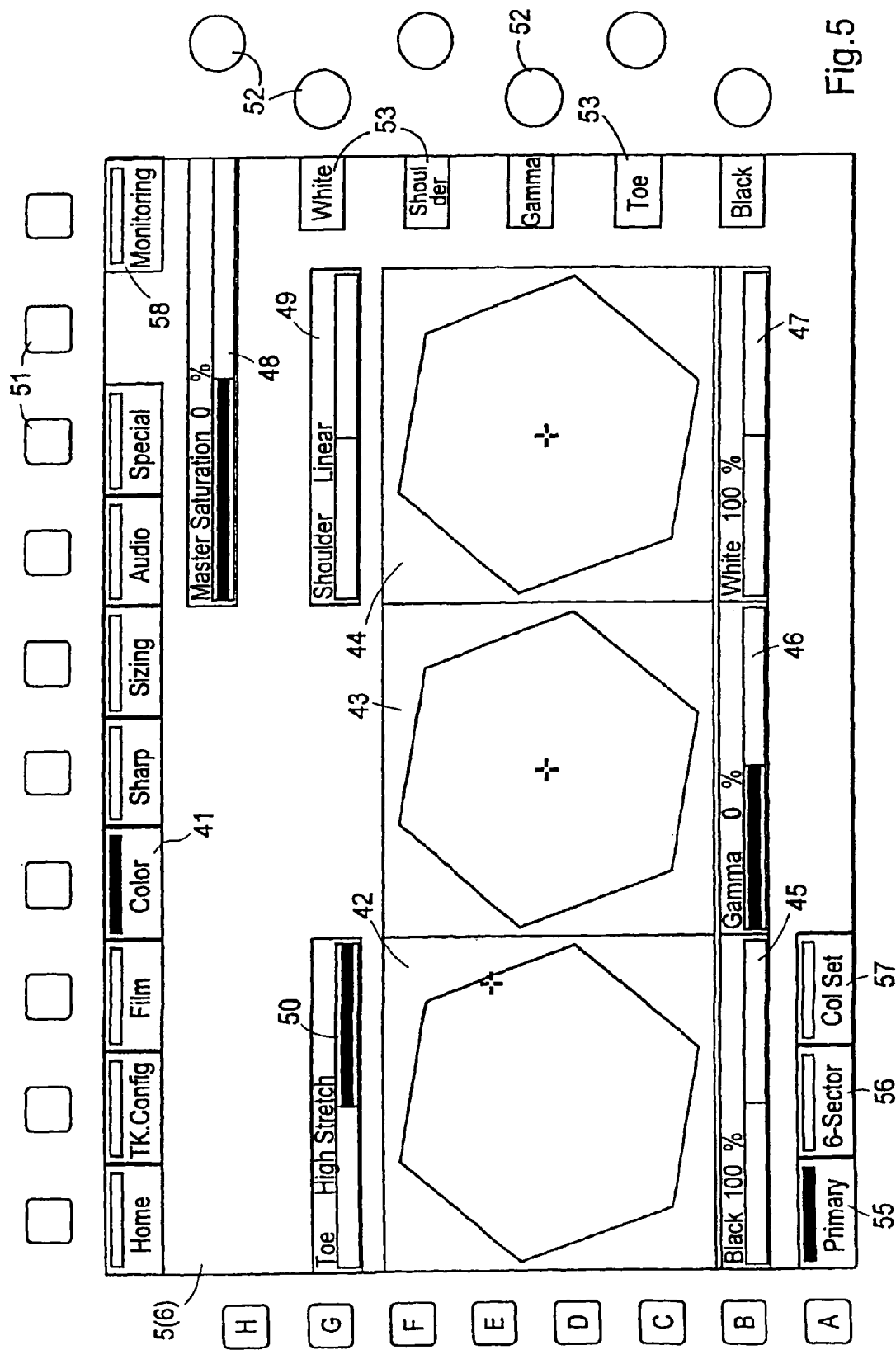
FIG. 5 shows a screen with a plurality of operating and display elements corresponding to a first menu.

FIG. 5 shows the screen 5 and the input field 6 with the representation of a menu for color setting. From a main menu (not represented), this menu can be reached by touching the field 41 "color". This menu comprises three two-dimensional regions 42, 43, 44 and a plurality of one-dimensional regions for the quantities to be set that are specified there. Various keys 51 are arranged at the top side of the screen, said keys having the same function as the touch fields 58 arranged adjacent. Arranged to the right of the screen are rotary knobs 52 having different functions depending on the menu set, said functions being explained at 53. Thus, by way of example, the quantity "master saturation", displayed at 48, can be set by means of the touch-sensitive inputting or by means of the upper rotary knob 52. It is additionally possible to provide further input devices, such as mouse and trackball.

Further functions can be called up using the keys A to H arranged at the left-hand edge of the screen; thus, by way of example, a normal value can be set using the key A. The key B serves for inserting numeric or alphanumeric information instead of the bar displays. Key C calls up a help text and key D serves for setting the translation between the movement of the touch point and the respective setting. The key E can be used to effect blocking against unauthorized operation. Key F is not allocated, while key G can be used to accept operating authority from another operating device. Finally, the key H serves for calling up a menu visited previously.

Figure 6:
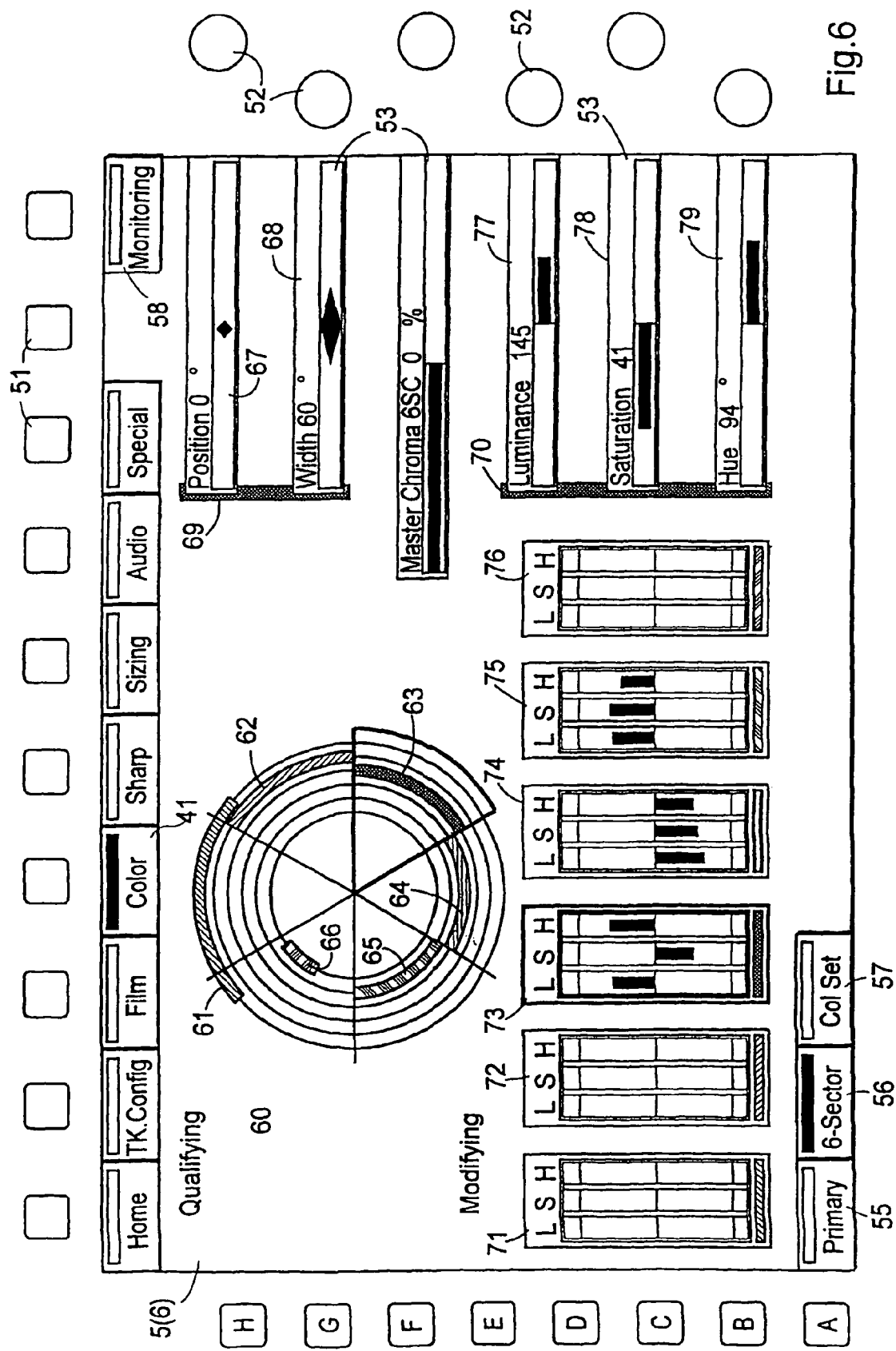
FIG. 6 shows a screen corresponding to a second menu.

On the screen in accordance with FIG. 5 there are further touch fields 55, 56, 57, which, when touched, effect a changeover to other menus, for example to a six-sector color correction, whose menu is shown in FIG. 6. As is known, in the case of six-sector color correction, it is possible to set colors which respectively fall within one of six sectors of the chromatic circle with regard to their luminance, their saturation and their hue (luminance L, saturation S and hue H). The colors which are respectively affected by these settings can be selected in the chromatic circle 60 designated by "qualifying", it being possible for the sectors 61 to 66 to be set individually with regard to their position and width. The sectors 61 to 66 may also overlap in this case. The setting is effected such that a respective one of the sectors 61 to 66 in the chromatic circle 60 is clicked on and the setting devices 67 and 68 assigned to this sector are thereupon set by touching and moving the touch point.

In that part of the menu which is designated by "modifying", triple displays 71 to 76 are respectively represented for one of the sectors. If one of the triple displays is clicked on, the operating and display elements 77, 78, 79 are assigned to this sector, as a result of which the setting of the luminance, the saturation and the hue can be performed for this sector.

In the situation represented in FIG. 6, the sector 63 and the triple display 73 are active with the color represented by crosshatching. Markings 69 and 70 with the same color indicate that the operating and display elements 67, 68, 77, 78, 79 are assigned to this color or the color sector.

Figure 7:
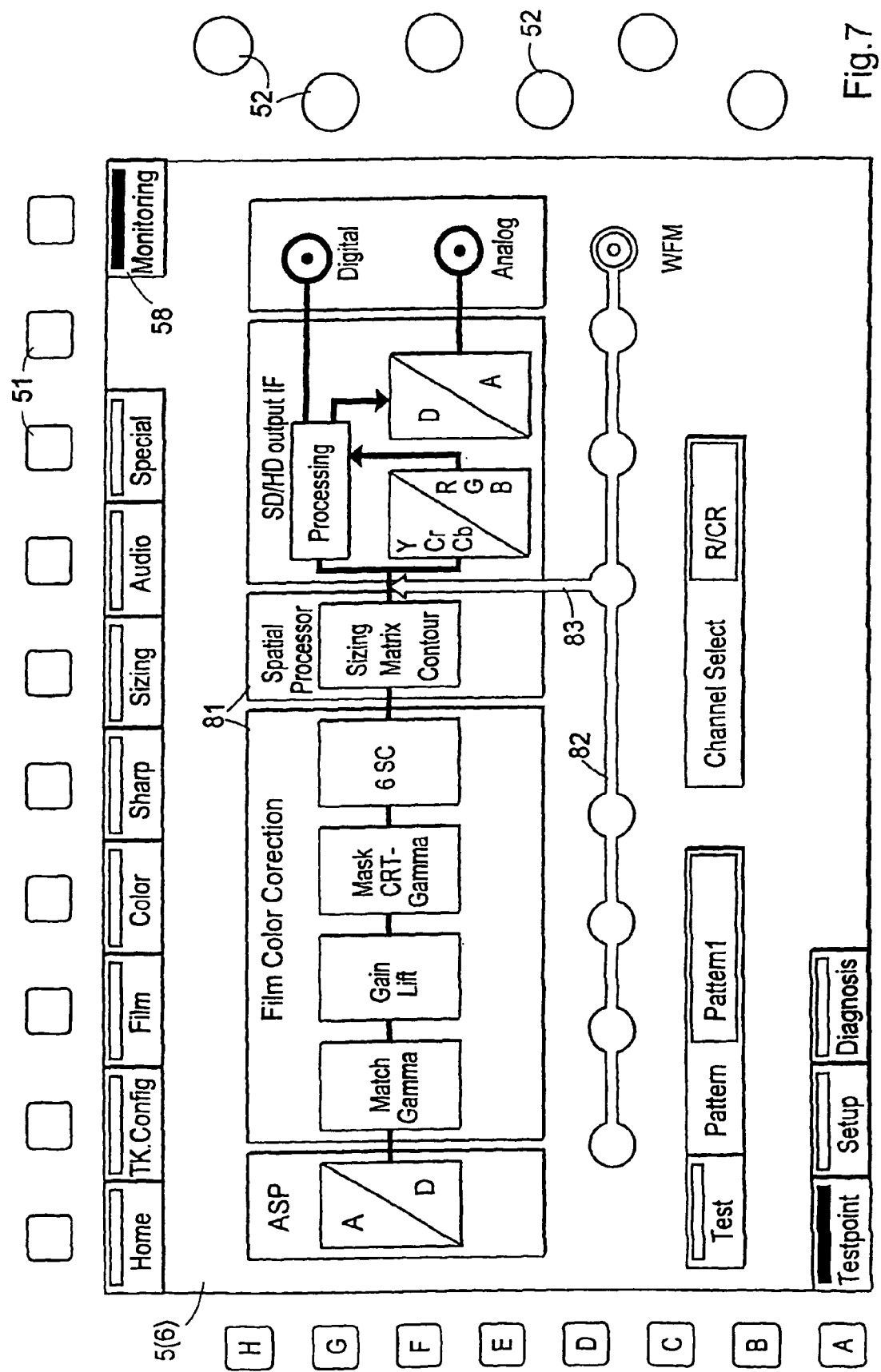
FIG. 7 shows a screen corresponding to a third menu.

By touching the field 58 "monitoring", a block diagram in accordance with FIG. 7 is represented on the screen. Situated below the block diagram 81 is a schematic representation 82 of a measuring and diagnosis device with a movable arrow 83 pointing at a point on the block diagram. By touching any point, the arrow 83 can be set to different measurement points. The signals at that measurement point are then forwarded to a measuring and diagnosis device that is present and the results are displayed on the measuring device (oscilloscope, vectorscope). Details concerning the measurement and diagnosis methods can be set through further touch-sensitive fields.

The invention claimed is:

1. An arrangement for operating television-technological apparatuses, comprising:
    a touch screen with operating and display elements being represented on the screen;
    the touch screen is provided with a touch-sensitive input field is provided for the screen, wherein a respective value of at least one quantity to be set is represented graphically on the screen, and
    the value of the at least one quantity is set by touching the touch-sensitive input field in a touch region enclosing the graphic representation, as to define a touch point, and moving the touch point in a direction corresponding to the change in the value of the at least one quantity to be set wherein the display elements display the value of a one-dimensional quantity by means of the length of a rectangle, and wherein the touch region is identified by an elongated quadrangle which encloses at least a maximum length.

2. The arrangement as claimed in claim 1, wherein the touch region is larger than the graphical representation of the at least one quantity to be set.

3. The arrangement as claimed in claim 1, wherein the at least one display element is a symbol represented on a display area, and wherein the touch region is an area enclosing the display area.

4. The arrangement as claimed in claim 1, wherein at least one of the numeric, alphanumeric and symbolic representations of the respective values are provided in addition to the graphical representation.

5. The arrangement as claimed in claim 4, wherein at least one of the numeric, alphanumeric and symbolic representations can be changed over.

6. The arrangement as claimed in claim 1, wherein a ratio between the movement and the change in the value of the at least one quantity to be set is adjustable.

7. The arrangement as claimed in claim 1, wherein a plurality of operating and display menus are provided, which can be selected with the aid of at least one of a touch region provided on the touch-sensitive input field, a key, a rotary regulator, and a trackball arranged beside the touch-sensitive input field.

8. The arrangement as claimed in claim 7, wherein the touch region is provided, that calls a subordinate menu when touched.

9. The arrangement as claimed in claim 7, wherein a setting device is provided besides the touch-sensitive input fields, the respective functions of the setting device being represented upon activation of the respective menu at the edge of the screen.

10. The arrangement as claimed in claim 1, wherein the quantity respectively set is transmitted to the television-technological apparatus, and wherein a received set quantity is sent back from the television-technological apparatus as to be displayed on the screen.

11. An arrangement for operating television-technological apparatuses, comprising:
    a touch screen with operating and display elements being represented on the screen;
    the touch screen is provided with a touch-sensitive input field is provided for the screen, wherein
    a respective value of at least one quantity to be set is represented graphically on the screen, and
    the value of the at least one quantity is set by touching the touch-sensitive input field in a touch region enclosing the graphic representation, as to define a touch point, and moving the touch point in a direction corresponding to the change in the value of the at least one quantity to be set, wherein the at least one operating element is realized by moving the touch point about a pivot point, the change in the value of the quantity to be set being effected by the respective angle of rotation, and wherein the touch region is significantly larger than the graphical representation of the operating element.

12. The arrangement as claimed in claim 11, wherein at least one of the numeric, alphanumeric and symbolic representations of the respective values are provided in addition to the graphical representation.

13. The arrangement as claimed in claim 12, wherein at least one of the numeric, alphanumeric and symbolic representations can be changed over.

14. The arrangement as claimed in claim 11, wherein a ratio between the movement and the change in the value of the at least one quantity to be set is adjustable.

15. The arrangement as claimed in claim 11, wherein a plurality of operating and display menus are provided, which can be selected with the aid of at least one of a touch region provided on the touch-sensitive input field, a key, a rotary regulator, and a trackball arranged beside the touch-sensitive input field.

16. The arrangement as claimed in claim 15, wherein the touch region is provided, that calls a subordinate menu when touched.

17. The arrangement as claimed in claim 15, wherein a setting device is provided besides the touch-sensitive input fields, the respective functions of the setting device being represented upon activation of the respective menu at the edge of the screen.

18. The arrangement as claimed in claim 11, wherein the quantity respectively set is transmitted to the television-technological apparatus, and wherein a received set quantity is sent back from the television-technological apparatus as to be displayed on the screen.

* * * * *